United States Patent
Kamarajugadda et al.

(10) Patent No.: US 7,411,264 B2
(45) Date of Patent: Aug. 12, 2008

(54) ETCH-STOP LAYERS FOR PATTERNING BLOCK STRUCTURES FOR REDUCING THERMAL PROTRUSION

(75) Inventors: Mallika Kamarajugadda, Eden Prairie, MN (US); Michael C. Kautzky, Eagan, MN (US); Stacy C. Wakham, Bloomington, MN (US); David C. Seets, Shorewood, MN (US); Arun Natarajun, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 313 days.

(21) Appl. No.: 10/991,569

(22) Filed: Nov. 18, 2004

(65) Prior Publication Data

US 2006/0102956 A1     May 18, 2006

(51) Int. Cl.
     *H01L 29/82*      (2006.01)
(52) U.S. Cl. .................. 257/422; 257/414; 257/421
(58) Field of Classification Search ............... 257/414, 257/421, 422
See application file for complete search history.

(56) References Cited

U.S. PATENT DOCUMENTS

| | | |
|---|---|---|
| 4,853,810 A | 8/1989 | Pohl et al. |
| 4,860,140 A | 8/1989 | Momata et al. |
| 5,021,906 A | 6/1991 | Chang et al. |
| 5,283,942 A | 2/1994 | Chen et al. |
| 5,303,105 A | 4/1994 | Jorgenson |
| 5,377,058 A | 12/1994 | Good et al. |
| 5,452,164 A | 9/1995 | Cole et al. |
| 5,490,028 A | 2/1996 | Ang et al. |
| 5,636,088 A | 6/1997 | Yamamoto et al. |
| 5,640,753 A | 6/1997 | Schultz et al. |
| 5,663,856 A | 9/1997 | Packard |
| 5,710,683 A | 1/1998 | Sundaram |
| 5,771,570 A | 6/1998 | Chhabra et al. |
| 5,774,975 A | 7/1998 | Maffitt et al. |
| 5,793,207 A | 8/1998 | Gill |
| 5,896,243 A | 4/1999 | Koshikawa et al. |
| 5,896,244 A | 4/1999 | Watanabe et al. |
| 5,898,542 A | 4/1999 | Koshikawa et al. |
| 5,909,340 A | 6/1999 | Lairson et al. |
| 5,949,627 A | 9/1999 | Williams et al. |
| 5,991,113 A | 11/1999 | Meyer et al. |
| 6,008,969 A | 12/1999 | Imai et al. |
| 6,043,959 A | 3/2000 | Crue et al. |
| 6,074,566 A | 6/2000 | Hsiao et al. |
| 6,078,455 A | 6/2000 | Enarson et al. |
| 6,151,194 A | 11/2000 | Steinbrecher |

(Continued)

OTHER PUBLICATIONS

U.S. Appl. No. 09/884,796, filed Jun. 19, 2001, Boutaghou et al.

(Continued)

*Primary Examiner*—Long Pham
(74) *Attorney, Agent, or Firm*—Kinney & Lange, PA

(57) ABSTRACT

The present invention provides a thin-film structure that includes an etch-stop layer having a first side and a second side, a patterned compensation layer for dissipating thermal energy, and an etch-vulnerable layer, where the etch-stop layer substantially impedes etching. The patterned compensation layer is adjacent the first side of the etch-stop layer, and the etch-vulnerable layer is adjacent the second side of the etch-stop layer.

23 Claims, 7 Drawing Sheets

U.S. PATENT DOCUMENTS

| | | | |
|---|---|---|---|
| 6,154,952 A | 12/2000 | Tangren | |
| 6,181,514 B1 | 1/2001 | Santini et al. | |
| 6,191,916 B1 | 2/2001 | Sasaki | |
| 6,212,040 B1 | 4/2001 | Hungerford | |
| 6,222,702 B1 | 4/2001 | Macken et al. | |
| 6,252,741 B1 | 6/2001 | Ahn | |
| 6,338,939 B1 | 1/2002 | Clarke et al. | |
| 6,349,014 B1 | 2/2002 | Crue, Jr. et al. | |
| 6,366,428 B1 | 4/2002 | Yamanaka et al. | |
| 6,381,094 B1 | 4/2002 | Gill | |
| 6,396,660 B1 | 5/2002 | Jensen et al. | |
| 6,441,994 B1 | 8/2002 | Wang et al. | |
| 6,452,742 B1 | 9/2002 | Crue et al. | |
| 6,466,401 B1 | 10/2002 | Hong et al. | |
| 6,477,007 B1 | 11/2002 | Shukh et al. | |
| 6,507,456 B1 | 1/2003 | Dinan et al. | |
| 6,510,025 B2 | 1/2003 | Narumi et al. | |
| 6,515,826 B1 | 2/2003 | Hsiao et al. | |
| 6,570,739 B2 | 5/2003 | Hsiao et al. | |
| 6,594,122 B1 * | 7/2003 | Shukh | 360/317 |
| 6,595,830 B1 | 7/2003 | Hewett et al. | |
| 6,602,620 B1 | 8/2003 | Kikitsu et al. | |
| 6,620,726 B1 | 9/2003 | Preusse et al. | |
| 6,621,659 B1 | 9/2003 | Shukh et al. | |
| 6,624,642 B1 | 9/2003 | Lyons et al. | |
| 6,661,605 B1 | 12/2003 | Pust et al. | |
| 6,747,841 B1 | 6/2004 | Olim et al. | |
| 6,754,050 B2 | 6/2004 | Kong et al. | |
| 6,946,322 B2 * | 9/2005 | Brewer | 438/109 |
| 2002/0012195 A1 | 1/2002 | Lahiri et al. | |
| 2002/0067571 A1 | 6/2002 | Yoshida et al. | |
| 2003/0067717 A1 | 4/2003 | Garfunkel et al. | |
| 2003/0099054 A1 | 5/2003 | Kamijima | |
| 2004/0051996 A1 | 3/2004 | Katzky et al. | |
| 2004/0080869 A1 | 4/2004 | Thompson et al. | |

OTHER PUBLICATIONS

U.S. Appl. No. 10/241,431, filed Sep. 11, 2002, Macken.
U.S. Appl. No. 10/271,954, filed Oct. 15, 2002, Shukh et al.
U.S. Appl. No. 10/277,878, filed Oct. 22, 2002, Pust.
U.S. Appl. No. 10/352,744, filed Jan. 28, 2003, Zou et al.
U.S. Appl. No. 10/375,621, filed Feb. 27, 2003, Pust.
U.S. Appl. No. 10/383,298, filed Mar. 7, 2003, Macken et al.
U.S. Appl. No. 10/421,538, filed Apr. 23, 2003, Kautzky.
U.S. Appl. No. 10/462,277, filed Jun. 16, 2003, Pendray et al.

* cited by examiner

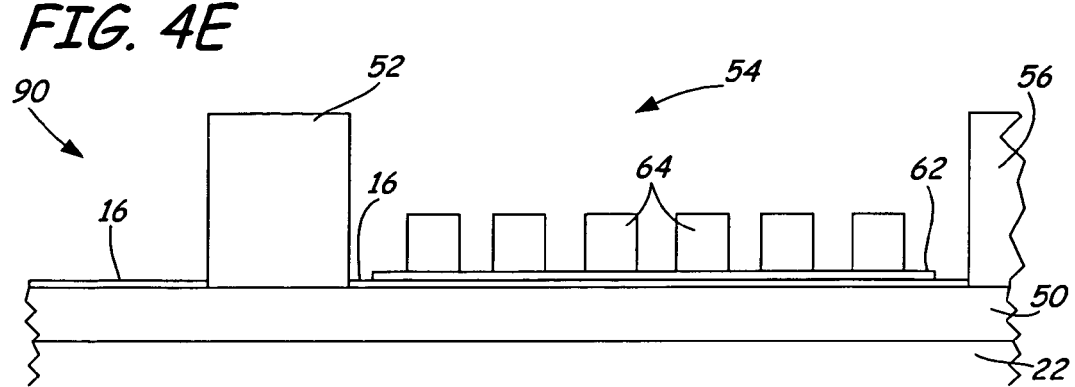
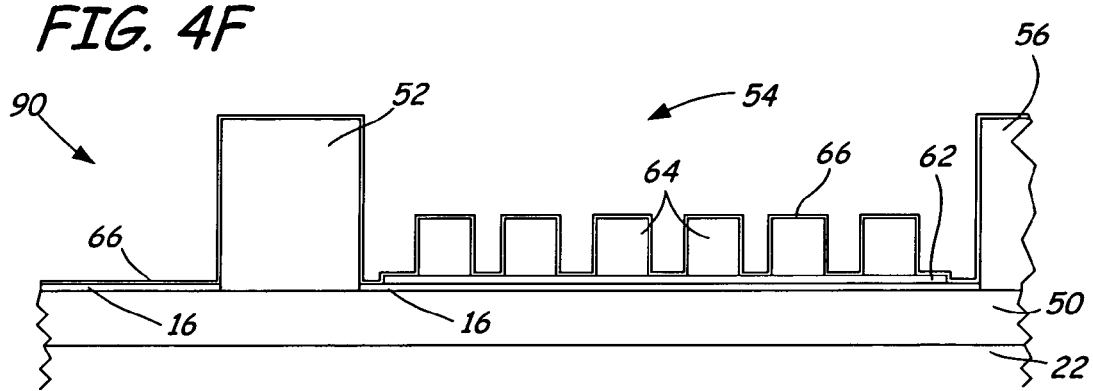
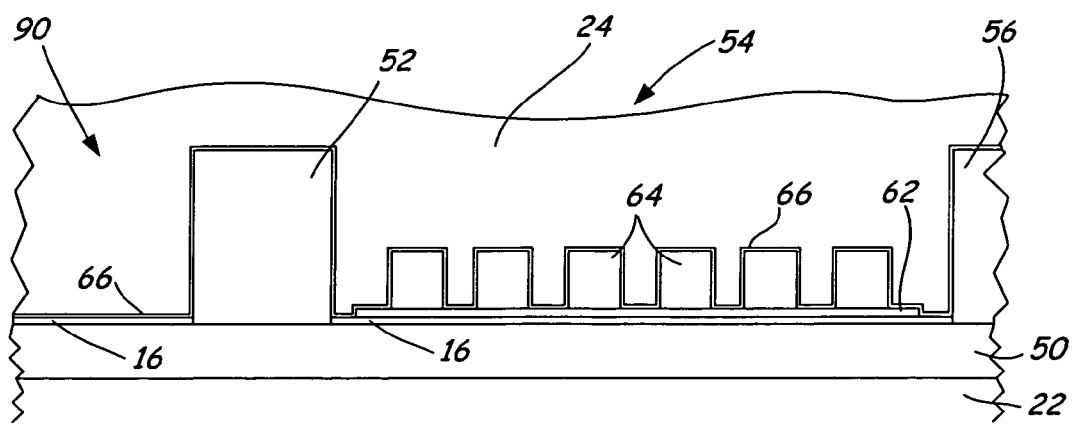

ETCH-STOP LAYERS FOR PATTERNING BLOCK STRUCTURES FOR REDUCING THERMAL PROTRUSION

BACKGROUND OF THE INVENTION

The present invention relates to the field of magnetic data storage and retrieval systems. In particular, the present invention relates to a thin film structure that exhibits improved thermal dissipation properties and a method of fabricating the same.

In a magnetic data storage and retrieval system, a transducing head generally includes a transducer, a substrate upon which the transducer is built, and an overcoat deposited over the transducer. The transducing head often times further includes a basecoat, which forms an interface layer between the substrate and the transducer, and is generally formed of an insulating material. The transducer, which typically includes a writer portion for storing magnetically-encoded information on a magnetic media and a reader portion for retrieving the magnetically-encoded information from the magnetic media, is formed of multiple patterned layers successively stacked upon the basecoat.

The transducer layers, which include both metallic and insulating layers, exhibit different mechanical and chemical properties than the substrate. The differences in properties affect several aspects of the transducer, including pole-tip recession/protrusion (PTR) of the metallic layers of the transducer relative to the substrate at an air bearing surface (ABS) of the transducing head.

During operation of the magnetic data storage and retrieval system, the ABS of the transducing head is positioned in close proximity to the magnetic media. Performance of the transducer depends primarily upon the head-media spacing (HMS), which is the distance between the transducer and the media. Preferably, the HMS is small enough to allow for writing to and reading from the magnetic media with a large areal density, and is great enough to prevent contact between the magnetic media and the transducing head. However, PTR at the ABS is considered to be a primary technical gap for hitting required HMS targets. During high drive ambient temperatures, PTR decreases HMS, which increases the risk of head-disc contact and the attendant mechanical reliability problems. Alternatively, during a cold write PTR can increase the HMS to the point of degrading writeablity, signal-to-noise ratio, and bit error rate.

The effects of PTR generally result from thermal pole-tip recession/protrusion (TPTR), current-induced recession/protrusion (CPTR), or a combination of TPTR and CPTR. TPTR arises from isothermal (global) temperature changes in the transducing head during drive operation. TPTR is proportional to the difference in coefficients of thermal expansion (CTE) between the transducing head and substrate materials. The CTE of materials used in forming the substrate are typically much smaller than the CTE of materials used in forming the metallic layers of the transducer. As such, when the transducing head is subjected to high operating temperatures, the transducer's metallic layers exhibit greater expansion compared to the substrate. This greater expansion causes the metallic layers to protrude closer to the magnetic disc than the substrate.

CPTR results from localized joule heating during application of currents to the writer coil and the resultant heat dissipation into the surrounding components of the transducing head. CPTR, in contrast to TPTR, is proportional to the first order of the $\Delta T(CTE)$ product, where $\Delta T$ is the localized temperature rise in the writer core, and CTE is based on the core fill material (i.e., the insulating material generally disposed around the writer coil in the writer core). At large write currents in the writer coil, $\Delta T$ can be more than 20° C., causing CPTR to exceed 0.3 micrometers, which is a large fraction of the total fly height budget. In the drive, heat transfer to the disc will reduce this value by 3-5 times, but it will still be a large portion of the total fly height budget. As such, CPTR places constraints on the amount of write current utilizable. Accordingly, there is a need in the industry for preventing significant TPTR and CPTR changes with temperature.

BRIEF SUMMARY OF THE INVENTION

The present invention provides a thin-film structure that includes an etch-stop layer having a first side and a second side, a patterned compensation layer for dissipating thermal energy, and an etch-vulnerable layer, where the etch-stop layer substantially impedes etching. The patterned compensation layer is adjacent the first side of the etch-stop layer, and the etch-vulnerable layer is adjacent the second side of the etch-stop layer.

The present invention further provides a thin-film structure that includes a compensation layer patterned by etching for dissipating thermal energy from a metallic layer, and an etch-stop layer for protecting a third layer from etching while the compensation layer is being patterned. The compensation layer has a first side and a second side, where the metallic layer is disposed adjacent the first side of the compensation layer. The etch-stop layer has a first side and a second side, where the first side of the etch-stop layer is disposed adjacent the second side of the compensation layer, and where the third layer is disposed adjacent the second side of the etch-stop layer.

The present invention further provides a transducing head having a writer core, where the transducing head includes an etch-vulnerable layer, a conductive coil disposed within the writer core, a compensation layer disposed within the writer core adjacent the conductive coil for dissipating thermal energy away from the coil, and an etch-stop layer disposed between the etch-vulnerable layer and the writer core for protecting the etch-vulnerable layer.

The present invention further provides a method of fabricating a thin-film structure. The method includes depositing an etch-stop layer over an etch-vulnerable layer, depositing a compensation layer over the etch-stop layer for dissipating thermal energy from the thin-film structure, and etching the compensation layer until the etch-stop layer is reached. The etch-vulnerable layer remains substantially unetched when the etch-stop layer is reached.

BRIEF DESCRIPTION OF THE DRAWINGS

FIGS. 4A-4J are sectional views of a third multi-layer structure of the present invention, where the third multi-layer structure is formed pursuant to the present invention.

DETAILED DESCRIPTION

Figure 1:
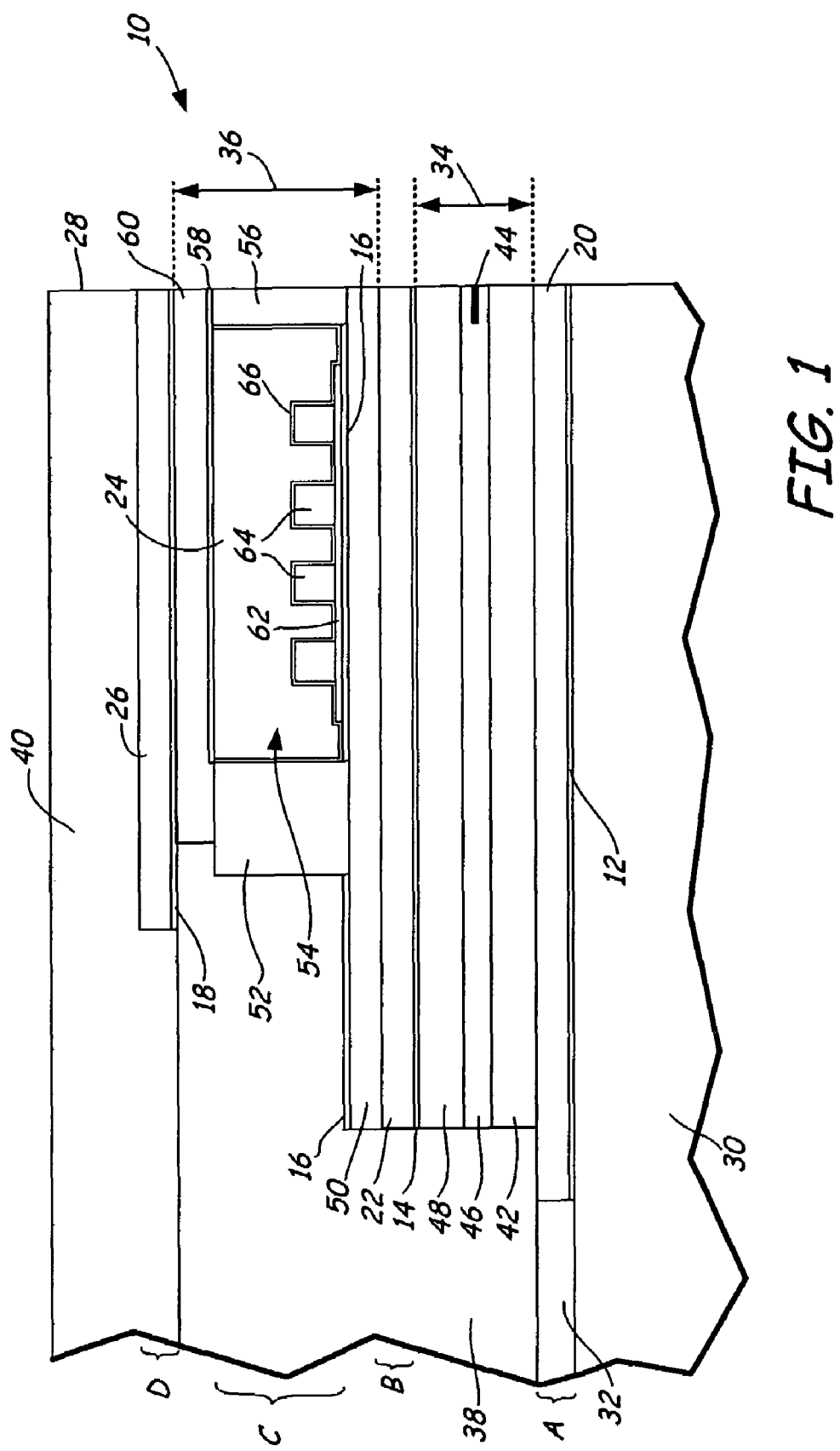
FIG. 1 is a partial cross-sectional view of the present invention.

FIG. 1 is a partial cross-sectional view of a transducing head 10 of the present invention. The transducing head 10 is a thin-film structure that includes etch-stop layers 12, 14, 16, 18 and compensation layers 20, 22, 24, 26, all of which reduce TPTR and/or CPTR in the transducing head 10 during operation. The reduction in TPTR and CPTR increases the accuracy in reaching HMS targets. Additionally, as discussed below, the etch-stop layers 12, 14, 16, 18 also protect underlying etch-vulnerable layers during patterning of the compensation layers 20, 22, 24, 26.

The cross-section of FIG. 1 is taken substantially normal to an ABS 28 of the transducing head 10. The terms "vertical", "vertically", and the like, herein refer to a direction parallel to the ABS 28 in the cross-section of FIG. 1. Similarly, the terms "horizontal", "horizontally", and the like, herein refer to a direction normal to the ABS 28 in the cross-section of FIG. 1.

As shown in FIG. 1, the etch-stop layers 12, 14, 16, 18 and the compensation layers 20, 22, 24, 26 are disposed in four locations of the transducing head 10, referred to as locations A, B, C, and D. The locations A, B, C, and D are examples of suitable locations for etch-stop layers and compensation layers of the present invention to reduce TPTR and/or CPTR. In various embodiments of the present invention, the transducing head 10 may include etch-stop layers and compensation layers at one or more of the locations A, B, C, and D. Alternatively, various embodiments of the present invention may include etch-stop layers and compensation layers in other locations of the transducing head 10 to reduce TPTR and/or CPTR.

The transducing head 10 further includes a substrate 30, a basecoat 32, a reader 34, a writer 36, a field insulator 38, and an overcoat 40. The etch-stop layer 12 and the basecoat 32 are disposed on the substrate 30, with the compensation layer 20 disposed on the etch-stop layer 12. (i.e., the location A). Examples of suitable materials for the substrate 30 include aluminum titanium carbide (AlTiC), titanium carbide (TiC), silicon (Si), silicon carbide (SiC), aluminum oxide ($Al_2O_3$), and combinations thereof. Examples of suitable materials for the basecoat 32 include aluminum oxide, aluminum nitride (AlN), silicon oxide ($SiO_2$), silicon nitride ($Si_3N_4$), silicon oxide nitrides ($SiO_{0-2}N_{0-1.5}$), and combinations thereof.

The reader 34 is stacked on the compensation layer 20, and the writer 36 is stacked on the reader 34 in a piggyback configuration (in which layers are not shared between the two elements) with the etch-stop layer 14 and the compensation layer 22 disposed between the reader 34 and the writer 36 (i.e., the location B). Alternatively, as discussed below, the reader 34 and the writer 36 may be arranged in a merged-configuration.

The etch-stop layer 16 and the compensation layer 24 are disposed between the layers of the writer 36 (i.e., the location C). The field insulator 38 is co-planarly positioned with the etch-stop layer 14, the compensation layer 22, the reader 34, and the writer 36, opposite the ABS 28. Examples of suitable materials for the field insulator 38 include the suitable materials for the basecoat 32.

The etch-stop layer 18 and the compensation layer 26 are disposed on the writer 36 and the field insulator 38 (i.e., the location D). The overcoat 40 is then located upon the compensation layer 26 and the field insulator 38. Examples of suitable materials for the overcoat 40 include the suitable materials for the basecoat 32.

The reader 34 includes a bottom shield 42, a read element 44, a read gap 46, and a top shield 48. The read gap 46 is defined on the ABS 28 vertically between the bottom shield 42 and the top shield 48. The read element 44 is positioned in the read gap 46 adjacent the ABS 28. The read gap 46 insulates the read element 44 from the bottom shield 42 and the top shield 48. The read gap 46 can be formed from insulating materials, such as aluminum oxides. The read element 44 can be a variety of different types of read elements, such as an anisotropic magnetoresistive (AMR) read element, a giant magnetoresistive (GMR) read element, and a tunneling giant magnetoresistive (TGMR) read element.

The writer 36 includes the etch-stop layer 16, a bottom pole 50, a back via 52, a writer core 54, a pole extension 56, a write gap 58, and a top pole 60. The bottom pole 50 is disposed on the compensation layer 22, and the etch-stop layer 16 is disposed on the bottom pole 50. The back via 52 and the pole extension 56 are also formed on the bottom pole 50, adjacent to the etch-stop layer 16, with the pole extension 56 being positioned adjacent the ABS 28 and the back via 52 being spaced away from the ABS 28. The write gap 58 is defined on the ABS 28 between the writer core 54/the pole extension 56 and the top pole 60. The top pole 60 is formed over the pole extension 56 and extends from the ABS 28 to the back via 52.

The writer core 54 includes the compensation layer 24, a bottom insulator 62, a conductive coil 64, and a dielectric layer 66. The bottom insulator 62 is disposed on the etch-stop layer 16 and the conductive coil 64 is encapsulated between the bottom insulator 62 and the dielectric layer 66. Examples of suitable materials for the bottom insulator 62 and the dielectric layer 66 include aluminum oxide, tantalum oxide ($Ta_2O_5$), hafnium oxide ($HfO_2$), titanium oxide ($TiO_2$), zirconium oxide ($ZrO_2$), copper oxide (CuO), niobium oxide ($Nb_2O_5$), silicon oxide, indium oxide ($In_2O_3$), magnesium oxide (MgO), titanium nitride (TiN), tantalum nitride (TaN), molybdenum nitride (MoN), niobium nitride (NbN), silicon nitride, aluminum nitride, tungsten nitrides (WN, $W_2N$), boron nitride (BN), and combinations thereof.

The conductive coil 64 is formed of an electrically-conductive metal, such as copper (Cu), gold (Au), or silver (Ag). A particularly suitable material for the conductive coil 64 is copper, which exhibits a CTE in a range of about $16.0 \times 10^{-6}/°$ C. to about $18.0 \times 10^{-6}/°$ C. The conductive coil 64 wraps around the back via 52, such that the flow of electrical current through the conductive coil 64 generates a magnetic field across the write gap 58. Other embodiments of the writer 36 do not use the pole extension 56, but rather use a two-piece top pole structure instead. Additionally, the writer 36 may be a longitudinal-style writer or a perpendicular-style writer. The remaining portion of the writer core 54 is filled with the compensation layer 24, which is disposed on the dielectric layer 66.

In the alterative merged-configuration, a shared pole may be used, which serves as the top shield 48 of the reader 34 and the bottom pole 50 of the writer 36. Not shown in FIG. 1 are electrical leads and contacts to the read element 44 and the conductive coil 64. The electrical leads and contacts may be formed of metals, such as copper, tantalum, gold, other metallic elements and alloys, and combinations thereof.

Many of the layers of the reader 34 (e.g., the bottom shield 42 and the top shield 48) and the writer 36 (e.g., the bottom pole 50, the back via 52, the pole extension 56, and the top pole 60) are formed of metallic materials. Preferably, each of these components is formed of an alloy primarily composed of iron (Fe), nickel (Ni), and/or cobalt (Co). Such metallic alloys, however, typically exhibit large CTE's. For example, Permalloy, a composition with about 80% nickel-20% iron or 79% nickel-21% iron, exhibits a CTE in the range of about $10.0 \times 10^{-6}/°$ C. to $13.0 \times 10^{-6}/°$ C.

In contrast, the substrate 30 is formed of materials with lower CTE's. Of these materials, aluminum oxide and titanium carbide exhibit CTE's in the range of about $6.0\times10^{-6}/°$ C. to about $9.0\times10^{-6}/°$ C., while silicon exhibits CTE's in the range of about $2.0\times10^{-6}/°$ C. to about $3.0\times10^{-6}/°$ C. The differences between the CTE's of the reader 34/writer 36 and the substrate 30 result in TPTR. During operation, the high temperatures produced cause the metallic layers of the reader 34 and the writer 36 to exhibit a greater expansion compared to the substrate 30. This greater expansion causes the reader 34 and the writer 36 to protrude closer to the magnetic disc than the substrate 30. Accordingly, this reduces the HMS, which may adversely affect the read/write capabilities of the transducing head 10.

The present invention addresses the problem of TPTR by first replacing a conventional basecoat layer at the location A with the etch-stop layer 12 and the compensation layer 20 to improve thermal dissipation from the reader 34 and the writer 36. In a conventional transducing head, a basecoat layer is typically formed on the corresponding substrate with insulating materials similar to the suitable materials for the basecoat 32 (e.g., $Al_2O_3$, AlN, $SiO_2$, $Si_3N_4$, or $SiO_{0.2}N_{0-1.5}$). Generally the insulating materials for basecoat layer are selected to match the chemical and mechanical properties of the corresponding substrate.

The compensation layer 20, however, improves thermal dissipation from the reader 34 and the writer 36 through the use of materials that exhibit high thermal conductivity, high modulus, and low CTE. Suitable thermal conductivities for materials of the compensation layer 20 include at least about 1.0 Watts/meter-Kelvin (W/m-K), with particularly suitable thermal conductivities including at least about 1.5 W/m-K. Suitable CTE's for materials of the compensation layer 20 include less than about $9.0\times10^{-6}/°$ C., with particularly suitable CTE's being less than about $6.0\times10^{-6}/°$ C.

Examples of suitable materials for the compensation layer 20 include tungsten, molybdenum, silicon, tantalum, zirconium, hafnium, osmium (Os), germanium (Ge), rhenium (Re), ruthenium (Ru), cerium (Ce), boron, iridium, aluminum, copper, oxides thereof, nitrides thereof, oxynitrides thereof, carbides thereof, and combinations thereof.

Additional examples of suitable materials for the compensation layers of the present invention (e.g., the compensation layers 20, 22, 24, 26), and the effectiveness of such materials, are disclosed in Zou et al., U.S. Patent Application No. 2004/0008451, entitled "Magnetic Transducers With Reduced Thermal Pole-Tip Protrusion/Recession"; Kautzky et al., U.S. Patent Application No. 2004/0051996, entitled "Writer Core Structures Having Improved Thermal Dissipation Properties"; and Thompson et al., U.S. Patent Application No. 2004/0080869, entitled "Magnetic Head Having a Heat Dissipating Structure", which are incorporated herein by reference in their entireties.

Examples of particularly suitable materials for the compensation layer 20 include tungsten and silicon nitride. The high thermal conductivity of the compensation layer 20 allows heat produced during operation to be readily transferred away from the reader 34 and the writer 36 to the substrate 30, reducing TPTR.

The term "length" herein refers to a distance in the horizontal direction. Examples of suitable lengths for the compensation layer 20 range from about 1 micrometer to about 100 micrometers. The compensation layer 20 desirably exhibits a length from the ABS 28 that is at least as great as a length of the reader 34 from the ABS 28. This allows the thermal dissipation to be effective along the entire length of the reader 34.

The terms "thickness", "layer thickness", and the like, herein refer to a distance in the vertical direction. Examples of suitable layer thickness for the compensation layer 20 range from about 1 micrometer to about 5 micrometers, with particularly suitable layer thicknesses ranging from about 1 micrometer to about 3 micrometers.

During the fabrication of the transducing head 10, the compensation layer 20 is patterned prior to deposition of subsequent layers. Suitable techniques for patterning the compensation layer 20 include a damascene process and a dry-etching process. The damascene process involves etching trenches in a conventional basecoat layer, filling the trenches with a compensation material (e.g., a suitable material for the compensation layer 20), and then planarizing via chemical-mechanical polishing.

Due to the size of the compensation layer 20, the trenches formed by a damascene process are several micrometers wide and high. As such, conventional vacuum deposition techniques, such as sputtering, typically do not uniformly fill the trenches with the compensation material. The non-uniform filling may result in overhangs and voids at the edges of the trenches, which are susceptible to corrosion during the chemical-mechanical polishing. Chemical vapor deposition (CVD) is generally a preferred deposition technique to the fill the trenches in a damascene process. However, the CVD typically involves high temperatures (e.g., greater than 250° C.), which generally exceed the desirable conditions for fabricating the transducing head 10.

In lieu of the damascene process, dry-etching processes, such as ion milling and inductively-coupled plasma (ICP) etching, are preferably used to pattern the compensation layer 20. ICP etching is generally preferred to ion milling. Ion milling is known to exhibit shadowing effects, redeposition issues, long mill times, non-vertical wall profiles, and require thick photoresist layers. In contrast, ICP etching offers advantages, such as profile control, substantially no redeposition, fast etch rates, and edge positioning control.

ICP etching of metals typically involves the use of fluorine-based or chlorine-based chemistries. These chemistries, however, are incompatible with several common materials used to fabricate the transducing head 10. For example, common insulating and magnetic materials, such as aluminum oxides and nickel/iron alloys, are readily etched by chlorine-based chemistries. Similarly, materials of the substrate 30, such as aluminum titanium carbide or titanium carbide, are readily etched by fluorine-based chemistries. As such, fluorine-based ICP etching of the compensation layer 20 will also etch exposed portions of the substrate 30. Such etching creates pits in the substrate 30, which increases roughness and delamination risk.

To protect the substrate 30 while the compensation layer 20 is ICP etched, the transducing head 10 includes the etch-stop layer 12, which is disposed between the compensation layer 20 and the substrate 30. The etch-stop layer 12 preferably exhibits a high etch resistance relative to the compensation layer 20 and the substrate 30. This allows the etch-stop layer 12 to protect the substrate 30 during ICP etching of the compensation layer 20.

Additionally, the etch-stop layer 12 preferably exhibits a high thermal conductivity to improve thermal dissipation with the compensation layer 20, to reduce TPTR. Examples of suitable thermal conductivities for the etch-stop layer 12 include at least about 1.0 W/m-K, with particularly suitable thermal conductivities including at least about 1.5 W/m-K. If the etch-stop layer 12 exhibited a low thermal conductivity, the thermal dissipation provided by the compensation layer 20 would be reduced.

The etch-stop layer 12 also desirably exhibits one or more of the following properties: non-magnetic, adequate seeding of the compensation layer 20, adequate adhesion to the compensation layer 20 and to the substrate 30, high corrosion resistance, low CTE, high resistance to removal steps for a hard mask used during ICP etching, and is compatible with slider processing and ABS exposure.

Examples of suitable materials for the etch-stop layer 12 include chromium (Cr), nickel, iron, copper, platinum (Pt), palladium (Pd), aluminum, gold, ruthenium, alloys thereof, carbides thereof, nitrides thereof, oxides thereof, and combinations thereof. Examples of particularly suitable materials for the etch-stop layer 12, for use with fluorine-based ICP etching, include chromium, nickel, iron, copper, platinum, palladium, aluminum, gold, ruthenium, alloys thereof, carbides thereof, nitrides thereof, oxides thereof, and combinations thereof. Examples of particularly suitable materials for the etch-stop layer 12, for use with chlorine-based ICP etching, include chromium, platinum, gold, ruthenium, alloys thereof, carbides, thereof, nitrides thereof, oxides thereof, and combinations thereof. The materials in this latter list allow the etch-stop layer 12 to protect underlying etch-vulnerable layers (e.g., the substrate 30) against both fluorine-based and chlorine-based ICP etching. Etch-vulnerable layers are layers of the transducing head 10 that can be etched by the fluorine and/or chlorine-based chemistries of ICP etching, but remain substantially intact and unetched due to the impedance provided by protection from the etch-stop layers of the present invention (e.g., etch-stop layers 12, 14, 16, 18).

The layer thickness for the etch-stop layer 12 is generally dictated by the etch selectivity of the compensation layer 20 to the etch-stop layer 12. Generally, the greater the etch selectivity, the thinner the etch-stop layer 12 may be. Examples of suitable layer thickness for the etch-stop layer 12 in use with the compensation layer 20 range from about 2.5 nanometers to about 200 nanometers, with particularly suitable layer thicknesses ranging from about 5 nanometers to about 100 nanometers, with more particularly suitable layer thicknesses ranging from about 10 nanometers to about 50 nanometers, and with even more particularly suitable layer thicknesses ranging from about 20 nanometers to about 25 nanometers.

An example of a particularly suitable material for the etch-stop layer 12 includes chromium. Chromium exhibits the above-discussed preferred and desirable properties of the etch-stop layer 12, produces sharp etched tungsten profiles with substantially no field residue, resists aluminum oxide hard mask wet etching, is readily ion milled, and an etch selectivity of tungsten to chromium of about 40:1 may be obtained. In use with the compensation layer 20 that includes tungsten, a particularly suitable layer thickness for an etch-stop layer 12 that includes chromium is about 20 nanometers.

During operation, the etch-stop layer 12 and the compensation layer 20 improve thermal dissipation from the reader 34 and the writer 36 by drawing heat from the reader 34 and the writer 36 to the substrate 30. This reduces the temperature in the reader 34 and the writer 36, which accordingly reduces TPTR in the transducing head 10. Additionally, the etch-stop layer 12 protects the substrate 30 while the compensation layer 20 is being patterned.

The present invention also addresses the problem of TPTR and CPTR by replacing a conventional spacer layer at the location B with the etch-stop layer 14 and the compensation layer 22. Maximum TPTR and CPTR typically exist in the middle of the transducing head 10, adjacent to the thick metallic layers of the reader 34 and the writer 36. Conventional transducing heads typically include spacer layers in this region to provide magnetic and electrical isolation. Typically, spacer layers are formed from insulating materials, such as aluminum oxides, which exhibit low thermal conductivities.

The compensation layer 22, however, improves thermal dissipation in the region between the reader 34 and the writer 36 through the use of materials that exhibit high thermal conductivity, high modulus, and low CTE. Examples of suitable properties, materials, and layer thicknesses for the compensation layer 22 are the same as for the compensation layer 20. In contrast to spacer layers of conventional transducing heads, the high thermal conductivity of the compensation layer 22 readily transfers heat produced during operation away from the reader 34 and the writer 36, thereby reducing TPTR and CPTR.

As discussed above for the compensation layer 20, during fabrication of the transducing head 10, the compensation layer 22 is patterned prior to deposition of subsequent layers. ICP etching is again the preferred method for patterning the compensation layer 22. A damascene process and ion milling may alternatively be used, but such techniques still exhibit the issues discussed above. When patterning the compensation layer 22 via ICP etching, fluorine-based and/or chlorine-based chemistries are applied. However, the field insulator 38 and the top shield 48 are incompatible with chlorine-based chemistries. As such, chlorine-based ICP etching of the compensation layer 22 will also etch exposed portions of the field insulator 38 and the top shield 48.

To protect the field insulator 38 and the top shield 48 during ICP etching of the compensation layer 22, the etch-stop layer 14 is disposed between the compensation layer 22 and the field insulator 38/top shield 48. Examples of suitable properties, materials, and layer thicknesses for the etch-stop layer 14 are the same as for the etch-stop layer 12. As such, the etch-stop layer 14 also preferably exhibits a high etch resistance and a high thermal conductivity.

The high etch resistance of the etch-stop layer 14 prevents the field insulator 38 and the top shield 48 from being etched while the compensation layer 22 is patterned. Moreover, during operation of the transducing head 10, the etch-stop layer 14 and the compensation layer 22 improve thermal dissipation in the region between the reader 34 and the writer 36. This reduces the temperature in the reader 34 and the writer 36, which accordingly reduces TPTR and CPTR in the transducing head 10.

The present invention also addresses the problems of CPTR by replacing a conventional core fill at the location C with the compensation layer 24. During a writing operation, current is applied to the conductive coil 64, which creates a localized joule heating in the writer core 54. As previously discussed, CPTR results from the localized joule heating and the resultant heat dissipation into the surrounding components of the transducing head 10.

Writer cores found in conventional transducing heads typically use insulating materials for the core fills, such as aluminum oxides, which exhibit low thermal conductivities. As such, heat produced by the conductive coil of a conventional transducing head builds up within the writer core. This increases CPTR, which is proportional to the first order of the $\Delta T(CTE)$ product, where $\Delta T$ is the localized temperature rise in the writer core, and the CTE is based on the material of the core fill. The high temperatures in the writer core cause the metallic layers of the writer to expand and protrude closer to the magnetic disc. This reduces the HMS, thereby adversely affecting the read/write capabilities of the conventional transducing head.

The transducing head 10, however, incorporates the compensation layer 24, which improves thermal dissipation from the writer core 54 through the use of materials that exhibit high thermal conductivity, high modulus, and low CTE. Examples of suitable properties, materials, and layer thicknesses for the compensation layer 24 are the same as for the compensation layer 20. The high thermal conductivity of the compensation layer 24 reduces the heat build up in the writer core 54. Similarly, the low CTE of the compensation layer 24 reduces the expansion of the writer 36. As such, the compensation layer 24 is effective for reducing CPTR in the transducing head 10.

Similar to compensation layers 20 and 22, ICP etching is the preferred method for patterning the compensation layer 24. When patterning the compensation layer 24 via ICP etching, fluorine-based and/or chlorine-based chemistries are required. However, chlorine-based ICP etching of the compensation layer 24 will also etch exposed portions of the field insulator 38 and the bottom pole 50.

To protect the field insulator 38 and the bottom pole 50 while the compensation layer 24 is ICP etched, the etch-stop layer 16 is disposed between the field insulator 38/bottom pole 50 and the writer core 54. Examples of suitable properties, materials, and layer thicknesses for the etch-stop layer 16 are the same as for the etch-stop layer 12. Similarly, the etch-stop layer 16 preferably exhibits a high etch resistance and a high thermal conductivity. As such, the high etch resistance of the etch-stop layer 16 prevents the field insulator 38 and the bottom pole 50 from being etched. Additionally, during a writing operation, the etch-stop layer 16 and the compensation layer 24 improve thermal dissipation from the writer 36 by drawing heat from the writer core 54. This accordingly reduces CPTR in the transducing head 10.

The present invention also addresses the problems of TPTR and CPTR by replacing a portion of a conventional overcoat layer at the location D with the etch-stop layer 18 and the compensation layer 26. Overcoat layers of conventional transducing heads are typically formed of insulating materials similar to the suitable materials for the overcoat 40 (e.g., $Al_2O_3$, AlN, $SiO_2$, $Si_3N_4$, and $SiO_{0.2}N_{0-1.5}$), which exhibit low thermal conductivities.

The compensation layer 26, however, improves thermal dissipation in this region through the use of materials that exhibit high thermal conductivity, high modulus, and low CTE. Examples of suitable properties, materials, and layer thicknesses for the compensation layer 26 are the same as for the compensation layer 20. In contrast to conventional overcoat layers, the high thermal conductivity of the compensation layer 26 allows heat produced during operation to be readily transferred away from the reader 34 and the writer 36, reducing TPTR and CPTR.

ICP etching is also the preferred method for patterning the compensation layer 26. When patterning the compensation layer 26 via ICP etching, fluorine-based and/or chlorine-based chemistries are required. However, chlorine-based ICP etching of the compensation layer 26 will also etch exposed portions of the field insulator 38 and the top pole 60. To protect the field insulator 38 and the top pole 60 while the compensation layer 24 is ICP etched, the etch-stop layer 18 is disposed between the compensation layer 26 and the field insulator 38/top pole 60. Examples of suitable properties, materials, and layer thicknesses for the etch-stop layer 18 are the same as for the etch-stop layer 12.

During the patterning of the compensation layer 26, the compensation layer 26 is ICP etched until the etch-stop layer 18 is reached. The high etch resistance of the etch-stop layer 18, however, prevents the field insulator 38 and the top pole 60 from being etched in the process. The etch-stop layer 18 and the compensation layer 26 also improve thermal dissipation from the reader 34 and the writer 36 by drawing heat from the reader 34 and the writer 36 to the overcoat 40. This reduces the temperature in the reader 34 and the writer 36, which accordingly reduces TPTR and CPTR in the transducing head 10.

The etch-stop layers 12, 14, 16, 18 protect the underlying etch-vulnerable layers from being etched during ICP etching of the compensation layers 20; 22, 24, 26, respectively. This allows the compensation layers 20, 22, 24, 26 to be used to reduce TPTR and/or CPTR without the risk of damaging the underlying etch-vulnerable layers during the fabrication of the transducing head 10. Additionally, because the etch-stop layers 12, 14, 16, 18 exhibit high thermal conductivity, the etch-stop layers 12, 14, 16, 18 also assist the compensation layers 20, 22, 24, 26 in dissipating heat from the reader 34 and the writer 36 to reduce TPTR and CPTR. This increases the accuracy of the transducing head 10 in hitting the required HMS targets.

Figure 2A:
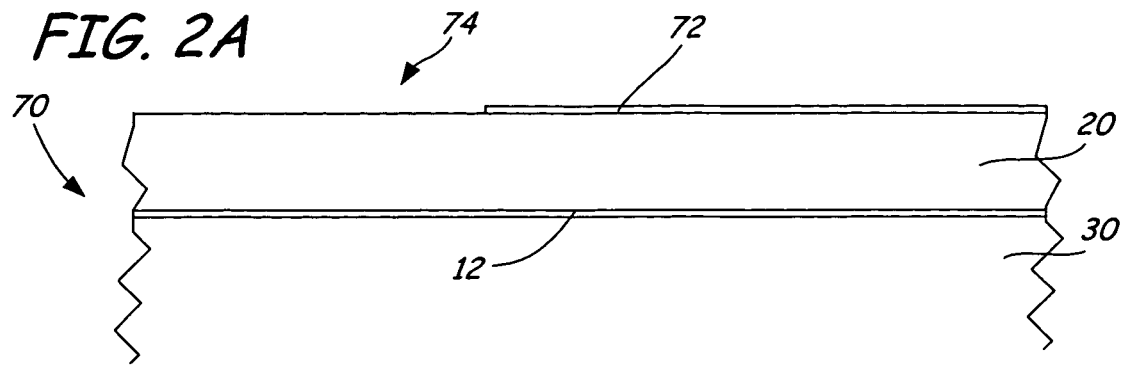
FIGS. 2A-2D are sectional views of a multi-layer structure of the present invention, where the multi-layer structure is formed pursuant to the present invention.

FIGS. 2A-2D are sectional views depicting a method of depositing and patterning the compensation layer 20 via ICP etching with the use of the etch-stop layer 12. FIG. 2A depicts a multi-layer structure 70 prior to patterning, which is a precursor component of the transducing head 10 at the location A. The multi-layer structure 70 includes the etch-stop layer 12, the compensation layer 20, the substrate 30, and a mask 72.

The multi-layer structure 70 is formed by depositing material for the etch-stop layer 12, such as chromium, on the substrate 30. Material depositions referred to herein may be performed by any conventional method, such as physical vapor deposition. After the etch-stop layer 12 is deposited, material for the compensation layer 20, such as tungsten, is deposited on the etch-stop layer 12. As previously discussed, the etch-stop layer 12 desirably exhibits adequate seeding of, and adhesion to, the compensation layer 20.

Finally, the mask 72 is prepared in any conventional manner. For example, a photoresist layer may be deposited on the compensation layer 20 to function as the mask 72, if the etch selectivity of the photoresist layer to compensation layer 20 is high. Alternatively, if the photoresist layer etches at an appreciable rate, a sacrificial hard mask layer may be employed, which is a layer of material having good etch selectivity to the compensation layer 20. In this scheme, the sacrificial hard mask layer is deposited on the compensation layer 20. A photoresist layer is then deposited on the sacrificial hard mask layer. The photoresist layer is then patterned to provide a template, which is then transferred to the sacrificial hard mask layer by dry etching. Typically the photoresist layer is then stripped, allowing the sacrificial hard mask layer to function as the mask 72. In either alternative, the mask 72 then covers a portion of the compensation layer 20 that will be retained.

After the mask 72 is prepared, the compensation layer 20 is patterned, preferably by ICP etching. The exposed surface 74 of the compensation layer 20 is etched away until the etch-stop layer 12 is reached. ICP etching is discontinued at this point. Because of the high etch resistance, the etch-stop layer 12 remains substantially intact after the ICP etching. More importantly, the substrate 30 remains substantially unetched when the etch-stop layer 20 is reached. This allows the compensation layer 20 to be ICP etched with either a fluorine-based or a chlorine-based chemistry, without the substrate 30 being damaged in the process.

Figure 2B:
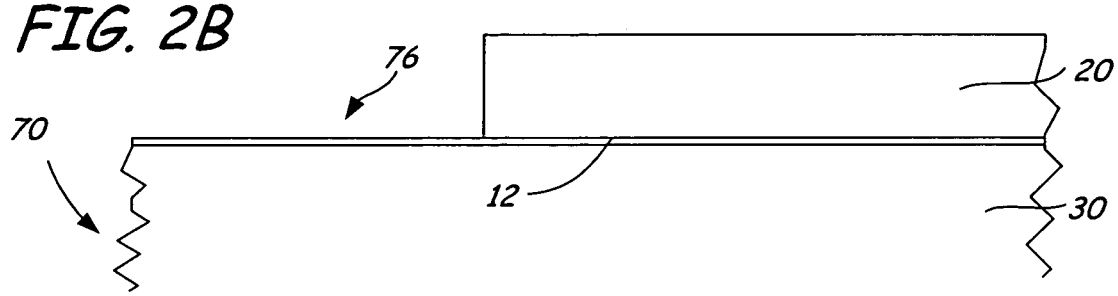

FIG. 2B depicts the multi-layer structure 70 after the compensation layer 20 is ICP etched and the mask 72 is stripped. Because the etch-stop layer 12 is disposed between the compensation layer 20 and the substrate 30, the substrate 30 remains substantially unetched.

As shown in FIG. 2B, after the compensation layer 20 is patterned, a portion 76 of the etch-stop layer 12 is exposed. The portion 76 of the etch-stop layer 12 is preferably removed to prevent incompatibilities with slider processing, to increase visual inspections during wafer build, and to prevent potential electrical shorting risks. As depicted in FIG. 1, the portion 76 of the etch-stop layer 12 has been removed in the vicinity of the basecoat 32. The portion 76 of the etch-stop layer 12 may be removed by conventional techniques that do not damage the substrate 30, such as ion milling.

Figure 2C:
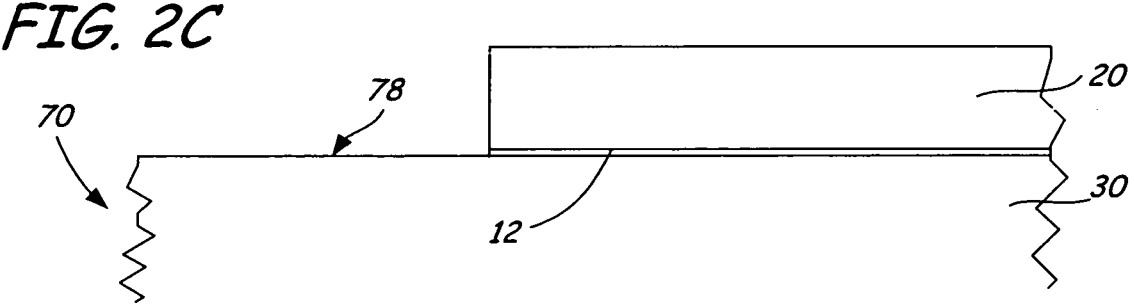

FIG. 2C depicts the multi-layer structure 70 after the exposed portion 76 of the etch-stop layer 12 is removed. An exposed portion 78 of the substrate 30 remains substantially unetched after the patterning of the compensation layer 20, and is ready for subsequent depositions. For example, material for the basecoat 32 may be deposited onto the compensation layer 20 and the substrate 30 to build the basecoat 32.

Figure 2D:
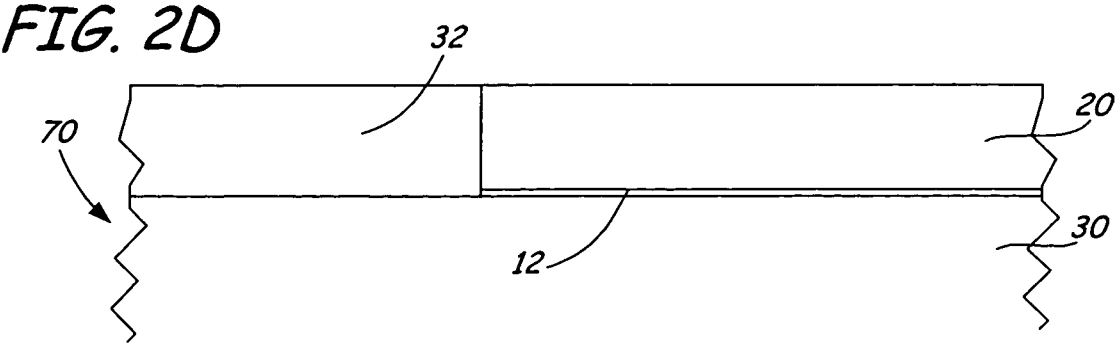

FIG. 2D depicts the multi-layer structure 70 after material for the basecoat 32 is deposited and planarized in a conventional manner, such as chemical-mechanical polishing. After planarization, the layers for the reader 34 may be deposited and patterned in a conventional manner. The etch-stop layer 12 and the compensation layer 20 are disposed between the substrate 30 and the reader 34 to improve thermal dissipation from the reader 34 and the writer 36 to reduce TPTR.

As discussed above, a damascene process is also a suitable technique for depositing and patterning the multi-layer structure 70. The damascene process differs from the ICP etching process discussed in FIGS. 2A-2C in that an entire layer of the basecoat 32 is first deposited on the etch-stop layer 12 and the substrate 30. For the reasons discussed above, the portion 76 of the etch-stop layer 12 is preferably removed prior to depositing the basecoat 32.

After the basecoat 32 is deposited, a trench is etched into the basecoat 32 until the etch-stop layer 12 is reached. The trench is then filled with material for the compensation layer 20. The compensation layer 20 and the basecoat 32 are then planarized. In a damascene process, the etch-stop layer 12 also protects the substrate 30 from etching, such that the substrate 30 remains substantially unetched after the compensation layer 20 is formed.

Figure 3A:
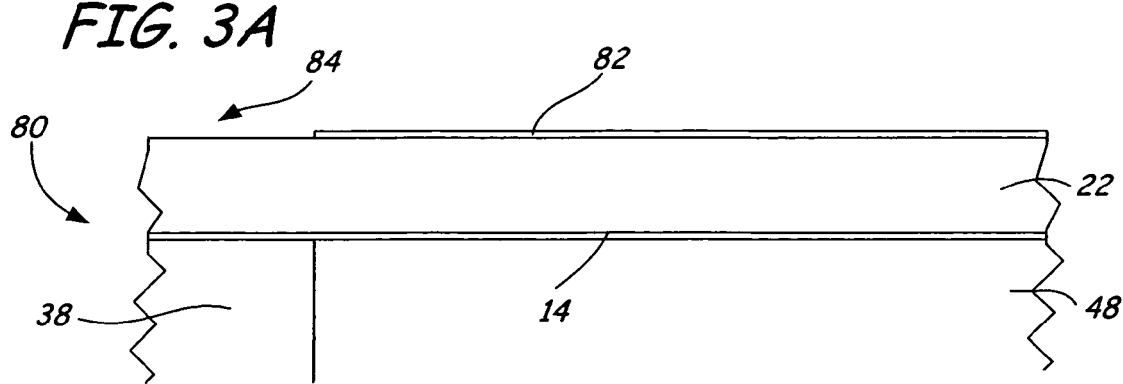
FIGS. 3A-3C are sectional views of a second multi-layer structure of the present invention, where the second multi-layer structure is formed pursuant to the present invention.
Figure 3B:
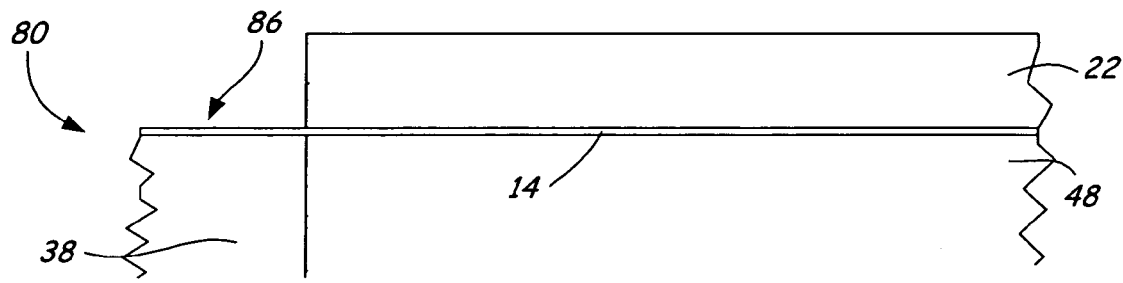
Figure 3C:
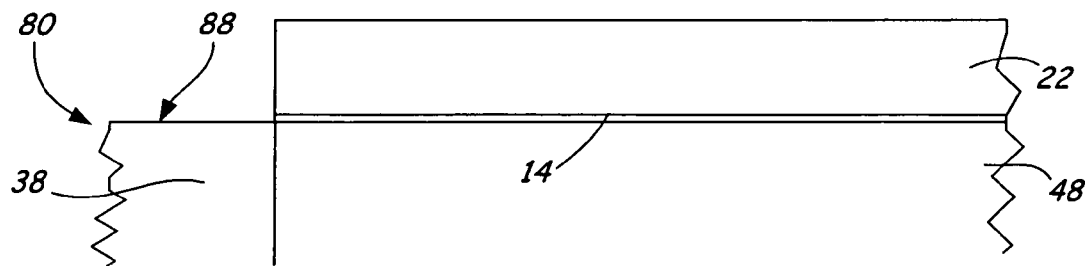

FIGS. 3A-3C are sectional views depicting a method of depositing and patterning the compensation layer 22 via ICP etching with the use of the etch-stop layer 14, which is similar to the method of depositing and patterning the compensation layer 20 in FIGS. 2A-2D. FIG. 3A depicts a multi-layer structure 80 prior to patterning, which is a precursor component of the transducing head 10 at the location B. The multi-layer structure 80 includes the etch-stop layer 14, the compensation layer 22, the top shield 48 of the reader 34, an underlying portion of the field insulator 38, and a mask 82.

The multi-layer structure 80 is formed by depositing the etch-stop layer 14 on the top shield 48 and the underlying portion of the field insulator 38. The compensation layer 22 is then deposited on the etch-stop layer 14. Finally, the mask 82 is prepared pursuant to the conventional techniques discussed above for the mask 72. The mask 82 then covers a portion of the compensation layer 22 that will be retained.

After the mask 82 is prepared, the compensation layer 22 is patterned, preferably by ICP etching. The exposed surface 84 of the compensation layer 22 is etched until the etch-stop layer 14 is reached. Because of the high etch resistance of the etch-stop layer 14, the etch-stop layer 14 substantially remains intact upon exposure to the ICP etching. More importantly, the top shield 48 and the underlying portion of the field insulator 38 remain substantially unetched when the etch-stop layer 22 is reached. This allows the compensation layer 22 to be ICP etched with either a fluorine-based or a chlorine-based chemistry, without the top shield 48 or the underlying portion of the field insulator 38 being damaged in the process.

FIG. 3B depicts the multi-layer structure 80 after the compensation layer 22 is ICP etched and the mask 82 is stripped. Because the etch-stop layer 14 is disposed between the compensation layer 22 and the top shield 48/underlying portion of the field insulator 38, the top shield 48 and the underlying portion of the field insulator 38 remain substantially unetched.

As shown in FIG. 3B, after the compensation layer 22 is patterned, a portion 86 of the etch-stop layer 14 is exposed. For the reasons discussed above for the etch-stop layer 12, the exposed portion 86 of the etch-stop layer 14 is also preferably removed. As depicted in FIG. 1, the exposed portion 86 of the etch-stop layer 14 has been removed from the underlying portion of the field insulator 38. The portion 86 of the etch-stop layer 14 may be removed by conventional techniques that do not damage the underlying portion of the field insulator 38, such as ion milling.

FIG. 3C depicts the multi-layer structure 80 after the exposed portion 86 of the etch-stop layer 14 is removed. An exposed portion 88 of the underlying portion of the field insulator 38 remains substantially unetched after the patterning of the compensation layer 22, and is ready for subsequent depositions. For example, material for the field insulator 38 may further be deposited onto the compensation layer 22 and the underlying portion of the field insulator 38 to further build the field insulator 38. The compensation layer 22 and the field insulator 38 can then be planarized in a conventional manner, such as chemical-mechanical polishing. The etch-stop layer 14 and the compensation layer 22 are then disposed between the reader 34 and the writer 36 to improve thermal dissipation in this region, to reduce TPTR and CPTR.

The use of the etch-stop layer 14 also permits the degree of overlap between the etch-stop layer 14, the compensation layer 22, the top shield 48 of the reader 34, and the bottom pole 50 of the writer 36 to be chosen on a design basis rather than etch protection basis. Because of the high etch resistance of the etch-stop layer 14, thick spacer layers are not required to protect the top shield 48 during fabrication of the writer 36. As such, the gap size between top shield 48 and the bottom pole 50 (i.e., the location B) may be determined based on size requirements or thermal dissipation requirements of the transducing head 10, rather than on etch protection requirements.

A damascene process is also a suitable technique for depositing and patterning the multi-layer structure 80 in a similar manner as for the multi-layer structure 70, discussed above. The field insulator 38 is deposited on the etch-stop layer 14 and the underlying portion of the filed insulator 38. For the reasons discussed above, the portion 86 of the etch-stop layer 14 is preferably removed prior to depositing the field insulator 38.

After the field insulator 38 is deposited, a trench is etched into the field insulator 38 until the etch-stop layer 14 is reached. The trench is then filled with material for the compensation layer 22. The compensation layer 22 and the field insulator 38 are then planarized in a conventional manner, such as chemical-mechanical polishing. Similar to ICP etching, the etch-stop layer 14 also protects the underlying portion of the field insulator 38 and the top shield 48 from etching.

Figure 4A:
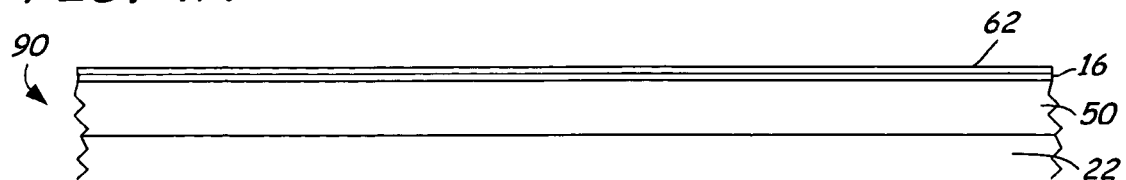

FIGS. 4A-4J are sectional views depicting a method of depositing and patterning the compensation layer 24 via ICP etching with the use of the etch-stop layer 16. As previously discussed, the compensation layer 24 replaces a conventional core fill to improve thermal dissipation in the writer core 54 to reduce CPTR. FIG. 4A depicts a multi-layer structure 90 prior to patterning, which is a precursor component of the transducing head 10 at the location C. The multi-layer structure 90 includes, the etch-stop layer 16, the compensation layer 22, the bottom pole 50, and the bottom insulator 62. Although not shown in FIGS. 4A-4J, the etch-stop layer 16 also extends over the field insulator 38 to protect the field insulator 38 during the fabrication of the writer core 54, as previously discussed.

The multi-layer structure 90 is formed by depositing the bottom pole 50 on the compensation layer 22. The etch-stop layer 16 is then deposited on the bottom pole 50. Finally, the bottom insulator 62 is deposited on the etch-stop layer 16. After the bottom insulator 62 is deposited, material for the conductive coils 64 are deposited and patterned in a conventional manner.

Figure 4B:
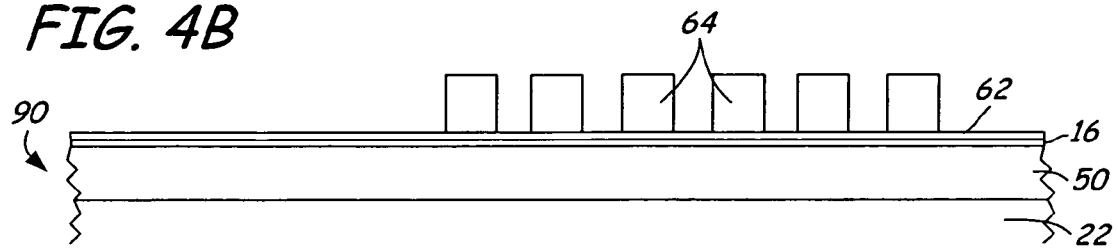

FIG. 4B depicts the multi-layer structure 90 after the conductive coils 64 are patterned. The bottom insulator 62 is then patterned in a conventional manner.

Figure 4C:
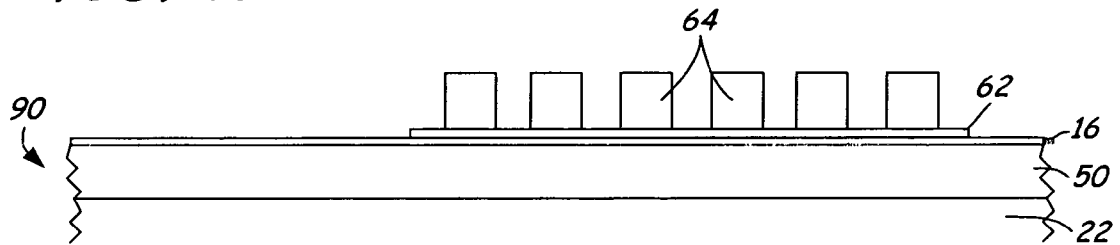

FIG. 4C depicts the multi-layer structure 90 after the bottom insulator 62 is patterned. As shown, the bottom insulator 62 remains between the conductive coils 64 and the underlying layers to prevent electrical shorting. After the bottom insulator 62 is patterned, the etch-stop layer 16 is patterned to provide contact locations for the back via 52 and the pole extension 56 on each side of the writer core 54. A suitable technique for patterning the etch-stop layer 16 is by ion milling, which may be readily performed with damaging the bottom pole 50. If the etch-stop layer 16 is not patterned, a magnetic gap would exist between the back via 52/pole extension 56 and the bottom pole 50.

Figure 4D:
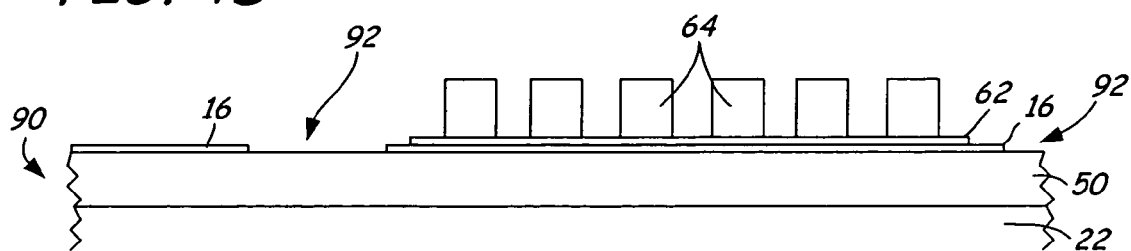

FIG. 4D depicts the multi-layer structure 90 after the etch-stop layer 16 is patterned. As shown, the etch-stop layer 16 is divided such that the bottom pole 50 has exposed surfaces 92. After the etch-stop layer 16 is patterned, material for the back via 52 and the pole extension 56 are deposited and patterned in a conventional manner.

FIG. 4E depicts the multi-layer structure 90 after the back via 52 and the pole extension 56 are built, which define the writer core 54. The etch-stop layer 16 covers all exposed portions of the bottom pole 50 from subsequent etching. After the back via 52 and the pole extension 56 are built, the dielectric layer 66 is deposited on the etch-stop layer 16, the back via 52, the pole extension 56, the bottom insulator 62, and the conductive coil 64.

FIG. 4F depicts the multi-layer structure 90 after the dielectric layer 66 is deposited. The bottom insulator 62 and the dielectric layer 66 encase and insulate the conductive coil 64. After the conductive coil 64 is insulated, the compensation layer 24 is deposited.

FIG. 4G depicts the multi-layer structure 90 after the compensation layer 24 is deposited. The compensation layer 24 replaces a conventional core fill with material that exhibits high thermal conductivity. The high thermal conductivity allows heat produced by the localized joule heating of the conductive coil 64 to dissipate out of the writer core 54. Moreover, the material of the compensation layer 24 exhibits a low CTE. As such, use of the compensation layer 24 in the writer core 54 reduces CPTR in the transducing head 10.

Figure 4H:
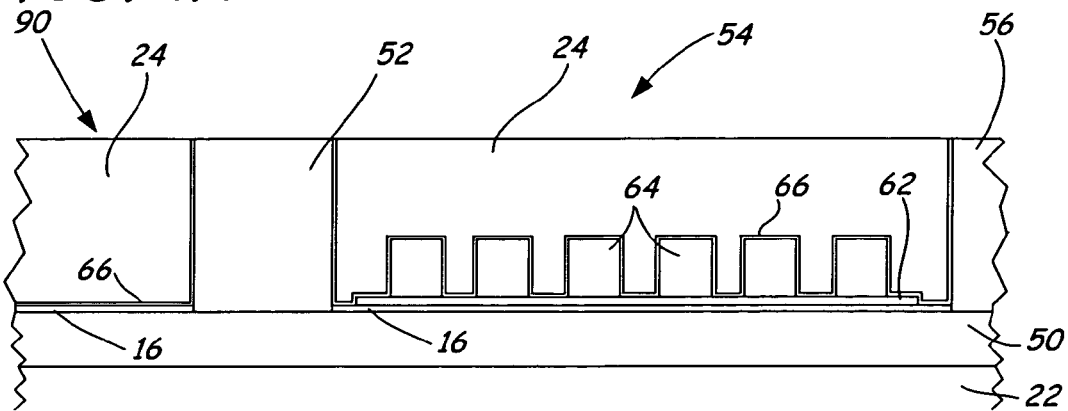

FIG. 4H depicts the multi-layer structure 90 after the compensation layer 24 is planarized in a conventional manner, such as chemical-mechanical polishing. The planarization also removes the dielectric layer 66 from the back via 52 and the pole extension 56, and creates a planarized surface that defines a lower surface for the write gap 58 (not shown). After planarization, the compensation layer 24 is patterned to remove excess material.

Figure 4I:
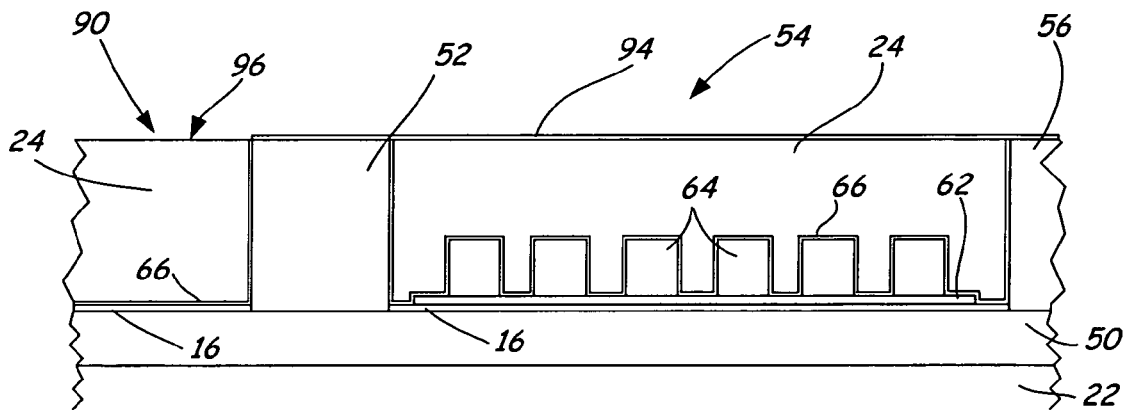

FIG. 4I depicts the multi-layer structure 90 prior to patterning of the compensation layer 24. As shown, the multi-layer structure 90 further includes a mask 94, which is prepared pursuant to the conventional techniques discussed above for the mask 72. The mask 94 then covers a portion of the compensation layer 24 that will be retained (in addition to the back via 52 and the pole extension 56).

After the mask 94 is prepared, the compensation layer 24 is patterned, preferably by ICP etching. The exposed surface 96 of the compensation layer 24 is etched until the etch-stop layer 16 is reached. The etching also removes the portion of the dielectric layer 66 under the exposed surface 96. Because of the high etch resistance of the etch-stop layer 16, the etch-stop layer 16 substantially remains intact upon exposure to the ICP etching. More importantly, the field insulator 38 (not shown) and the bottom pole 50 remain substantially unetched when the etch-stop layer 16 is reached. This allows the compensation layer 24 to be ICP etched with either a fluorine-based or a chlorine-based chemistry, without the field insulator 38 or the bottom pole 50 being damaged in the process.

Figure 4J:
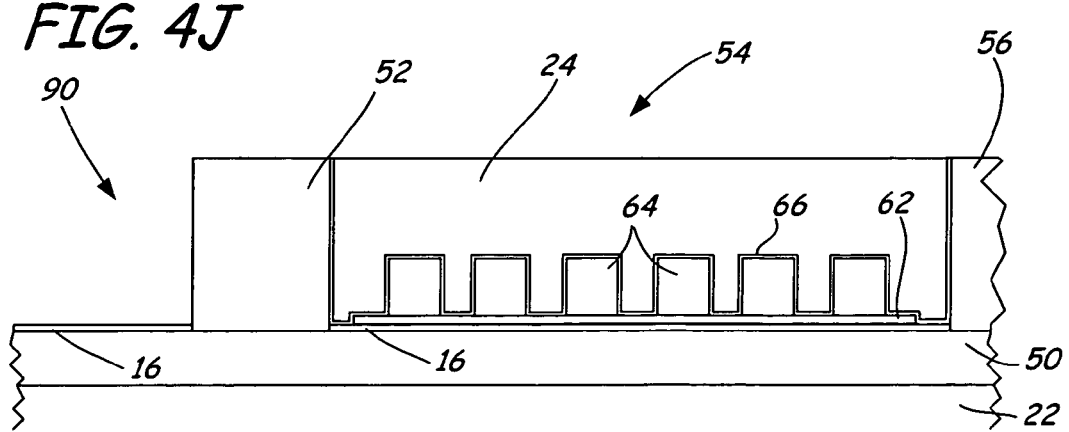

FIG. 4J depicts the multi-layer structure 90 after the compensation layer 24 is ICP etched and the mask 94 is stripped. Because the etch-stop layer 16 is disposed between the compensation layer 24 and the field insulator 38/bottom pole 50, the field insulator 38 and the bottom pole 50 remain substantially unetched.

As discussed above for etch-stop layers 12 and 14, the exposed portion of the etch-stop layer 16 at the field insulator 38 (not shown) is also preferably removed. As depicted in FIG. 1, the etch-stop layer 16 has been removed from an underlying portion of the field insulator 38. The exposed portion of the etch-stop layer 16 may be removed by conventional techniques that do not damage the underlying portion of the field insulator 38, such as ion milling.

After the patterning of the compensation layer 24 and the removal of the etch-stop layer 16 at the insulator field 38, the remaining layers of the transducing head 10 may then be built on the multi-layer structure 90. Accordingly, the compensation layer 24 is disposed in the writer core 54 to improve thermal dissipation for reducing CPTR in the writer 36.

A damascene process is also a suitable technique for depositing and patterning the multi-layer structure 90. An example of a suitable damascene process for the multi-layer structure 90 is disclosed in Kautzky et al., U.S. Patent Application No. 2004/0051996, which is incorporated herein by reference in its entirety. However, prior to performing the damascene process, the etch-stop layer 16 is deposited and preferably patterned, as discussed above. This allows the etch-stop layer 16 to protect the bottom pole 50 from etching during fabrication of the multi-layer structure 90.

Figure 5A:
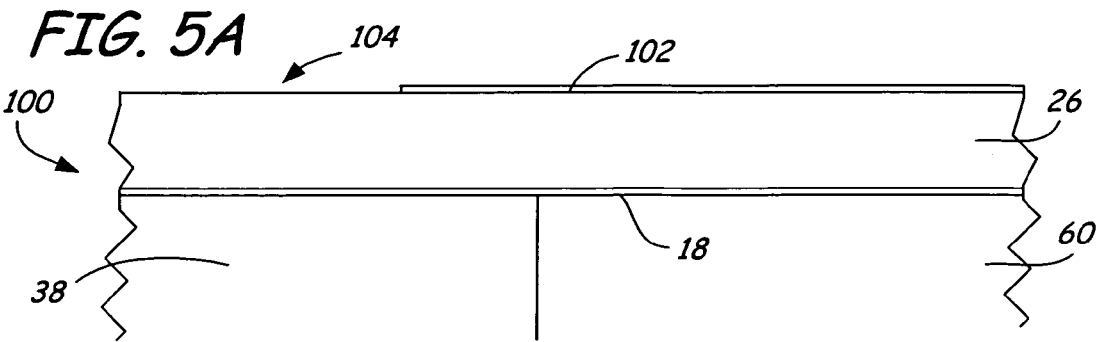
FIGS. 5A-5D are sectional views of a fourth multi-layer structure of the present invention, where the fourth multi-layer structure is formed pursuant to the present invention.

FIGS. 5A-5D are sectional views depicting a method of depositing and patterning the compensation layer 26 via ICP etching with the use of the etch-stop layer 18. The method discussed in FIGS. 5A-5D is similar to the method of depositing and patterning compensation layers 20 and 22 in FIGS. 2A-2D and 3A-3C, respectively. FIG. 5A depicts a multi-layer structure 100 prior to patterning, which is a precursor component of the transducing head 10 at the location D. The multi-layer structure 100 includes, the etch-stop layer 18, the compensation layer 26, the top pole 60 of the writer 36, the field insulator 38, and a mask 102.

The multi-layer structure 100 is formed by depositing the etch-stop layer 18 on the top pole 60 and the field insulator 38.

The compensation layer 26 is then deposited on the etch-stop layer 18. Finally, a mask 102 is prepared pursuant to the conventional techniques discussed above for the mask 72. The mask 102 then covers a portion of the compensation layer 26 that will be retained.

After the mask 102 is prepared, the compensation layer 26 is patterned, preferably by ICP etching. The exposed surface 104 of the compensation layer 26 is etched until the etch-stop layer 18 is reached. Because of the high etch resistance of the etch-stop layer 18, the etch-stop layer 18 substantially remains intact upon exposure to the ICP etching. More importantly, the field insulator 38 and the top pole 60 remain substantially unetched when the etch-stop layer 18 is reached. This allows the compensation layer 26 to be ICP etched with either a fluorine-based or a chlorine-based chemistry, without the field insulator 38 or the top pole 60 being damaged in the process.

Figure 5B:
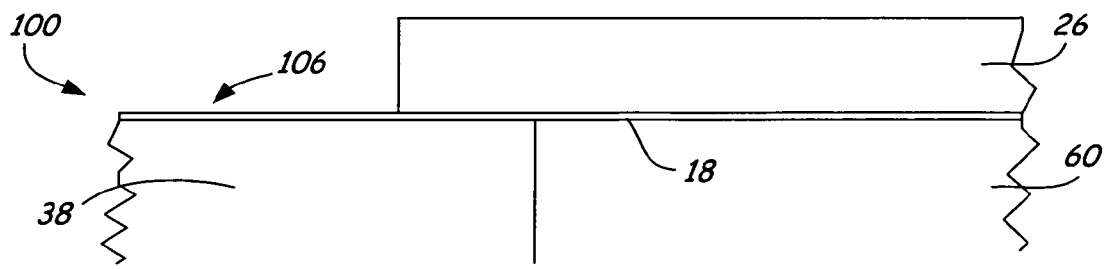

FIG. 5B depicts the multi-layer structure 100 after the compensation layer 26 is ICP etched and the mask 102 is stripped. Because the etch-stop layer 18 is disposed between the compensation layer 26 and the field insulator 38/top pole 60, the field insulator 38 and the top pole 60 remain substantially unetched.

As shown in FIG. 5B, after the compensation layer 26 is patterned, a portion 106 of the etch-stop layer 18 is exposed. For the reasons discussed above, the exposed portion 106 of the etch-stop layer 18 is also preferably removed. As depicted in FIG. 1, the exposed portion 106 of the etch-stop layer 18 has been removed from the underlying portion of the field insulator 38. The portion 106 of the etch-stop layer 18 may be removed by conventional techniques that do not damage the underlying portion of the field insulator 38, such as ion milling.

Figure 5C:
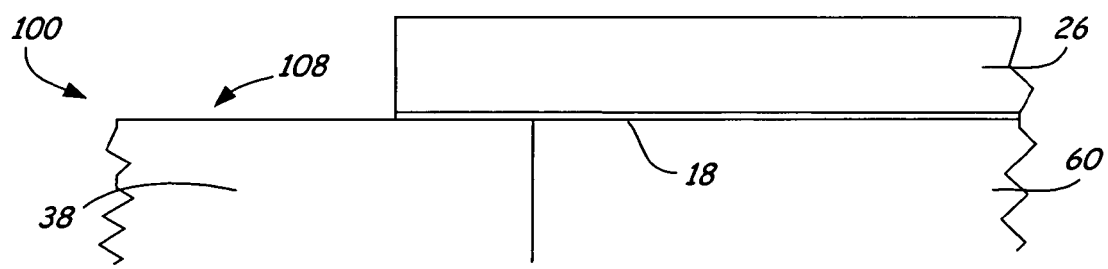

FIG. 5C depicts the multi-layer structure 100 after the exposed portion 106 of the etch-stop layer 18 is removed. An exposed portion 108 of the field insulator 38 remains substantially unetched by the patterning of the compensation layer 26, and is ready for subsequent depositions. For example, material for the overcoat 40 may further be deposited onto the compensation layer 26 and the field insulator 38. The overcoat 40 may then be planarized in a conventional manner, such as chemical-mechanical polishing.

Figure 5D:
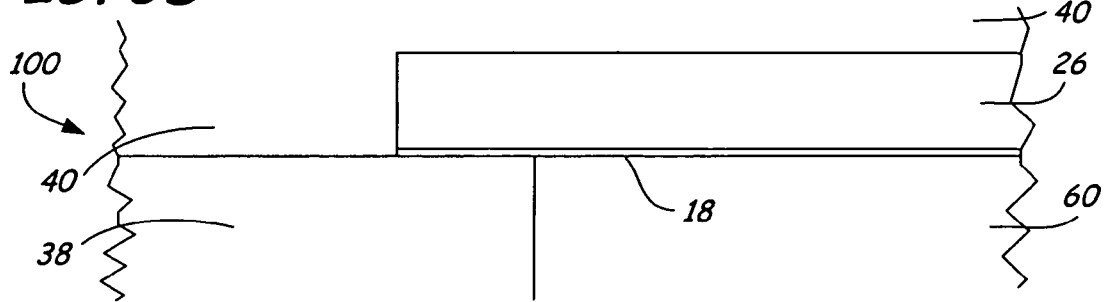

FIG. 5D depicts the multi-layer structure 100 after material for the overcoat 40 is deposited and planarized (planarization not shown). The etch-stop layer 18 and the compensation layer 26 are then disposed between the writer 36 and the overcoat 40 to improve thermal dissipation to reduce TPTR and CPTR.

A damascene process is also a suitable technique for depositing and patterning the multi-layer structure 100 in a similar manner as for the multi-layer structure 70, discussed above. The overcoat 40 is deposited on the etch-stop layer 18, which is then etched to form a trench until the etch-stop layer 18 is reached. The trench is then filled with material for the compensation layer 26. The compensation layer 26 and the field insulator 38 are then planarized via chemical-mechanical polishing. After planarization, additional material for the overcoat 40 is deposited on the compensation layer 26 and the portion of the overcoat 40 that is co-planar to the compensation layer 26. Similar to the ICP etching method discussed above, the etch-stop layer 18 also protects the underlying portion of the field insulator 38 and the top pole 60 from etching.

Although the present invention has been described with reference to preferred embodiments, workers skilled in the art will recognize that changes may be made in form and detail without departing from the spirit and scope of the invention.

The invention claimed is:

1. A thin-film structure comprising:
an etch-stop layer comprising a first side and a second side;
a patterned compensation layer for dissipating thermal energy, wherein the patterned compensation layer adjoins the first side of the etch-stop layer; and
an etch-vulnerable layer adjacent the second side of the etch-stop layer;
wherein the etch-stop layer substantially impedes etching; and
wherein the patterned compensation layer is effective for reducing thermal pole-tip recession/protrusion in the thin-film structure.

2. The thin-film structure of claim 1, wherein the patterned compensation layer is effective for reducing current-induced pole-tip recession/protrusion in the thin-film structure.

3. The thin-film structure of claim 1 further comprising a metallic layer formed of a material exhibiting a coefficient of thermal expansion greater than a coefficient of thermal expansion of a material forming the etch-vulnerable layer.

4. The thin-film structure of claim 3, wherein the etch-vulnerable layer comprises a substrate.

5. The thin-film structure of claim 1, wherein the etch-vulnerable layer comprises a shield of a transducing head reader.

6. The thin-film structure of claim 5, wherein the compensation layer dissipates thermal energy away from the etch-vulnerable layer.

7. A thin-film structure comprising:
an etch-stop layer comprising a first side and a second side;
a patterned compensation layer for dissipating thermal energy, wherein the patterned compensation layer adjoins the first side of the etch-stop layer; and
an etch-vulnerable layer adjacent the second side of the etch-stop layer;
wherein the etch-stop layer substantially impedes etching; and
wherein the etch-vulnerable layer comprises a pole of a transducing head writer.

8. The thin-film structure of claim 7 further comprising a transducing head writer core having a conductive coil, wherein the compensation layer is disposed within the transducing head writer core for dissipating thermal energy away from the conductive coil.

9. The thin-film structure of claim 8, wherein the compensation layer exhibits a coefficient of thermal expansion less than about $6.0 \times 10^{-6}/°C$.

10. The thin-film structure of claim 1, wherein the etch-vulnerable layer comprises a top pole of a transducing head writer.

11. The thin-film structure of claim 10, wherein the compensation layer dissipates thermal energy away from the etch-vulnerable layer.

12. The thin-film structure of claim 1, wherein an etch selectivity of the compensation layer to etch-stop layer is about 40:1.

13. The thin-film structure of claim 1, wherein the compensation layer exhibits a thermal conductivity of at least about 1.5 W/m-K.

14. The thin-film structure of claim 13, wherein the etch-stop layer exhibits a thermal conductivity of at least about 1.5 W/m-K.

15. The thin-film structure of claim 1, wherein the etch-stop layer comprises at least one of chromium, nickel, iron, copper, platinum, palladium, aluminum, gold, ruthenium, carbides thereof, nitrides thereof, oxides thereof, and combinations thereof.

16. A thin-film structure comprising:
a compensation layer patterned by etching and comprising a first side and a second side, wherein the compensation layer dissipates thermal energy from a metallic layer disposed adjacent the first side of the compensation layer; and
an etch-stop layer comprising a first side and a second side, wherein the first side of the etch-stop layer adjoins the second side of the compensation layer for protecting an etch-vulnerable layer from etching while the compensation layer is being patterned, and wherein the etch-vulnerable layer is disposed adjacent the second side of the etch-stop layer.

17. The thin-film structure of claim 16, wherein the etch-vulnerable layer comprises a substrate.

18. The thin-film structure of claim 16, wherein the etch-vulnerable layer comprises a shield of a transducing head reader.

19. The thin-film structure of claim 16, wherein the etch-vulnerable layer comprises a pole of a transducing head writer.

20. The thin-film structure of claim 16, wherein the etch-vulnerable layer comprises a top pole of a transducing head writer.

21. The thin-film structure of claim 16, wherein an etch selectivity of the compensation layer to etch-stop layer is about 40:1.

22. The thin-film structure of claim 16, wherein the compensation layer exhibits a thermal conductivity of at least about 1.5 W/m-K.

23. The thin-film structure of claim 22, wherein the etch-stop layer exhibits a thermal conductivity of at least about 1.5 W/m-K.

* * * * *

UNITED STATES PATENT AND TRADEMARK OFFICE
CERTIFICATE OF CORRECTION

| | |
|---|---|
| PATENT NO. | : 7,411,264 B2 |
| APPLICATION NO. | : 10/991569 |
| DATED | : August 12, 2008 |
| INVENTOR(S) | : Mallika Kamarajugadda et al. |

It is certified that error appears in the above-identified patent and that said Letters Patent is hereby corrected as shown below:

On the Title Page, Item (75) Inventors, delete "Stacy C. Wakham,", and insert --Stacy C. Wakeham--

Column 9, Line 10, delete "layers 20; 22,", insert --layers 20, 22,--

Signed and Sealed this

Fifth Day of May, 2009

JOHN DOLL
*Acting Director of the United States Patent and Trademark Office*